Sept. 28, 1926.
C. F. RUBSAM
WHEEL
Filed July 27, 1923
1,601,455
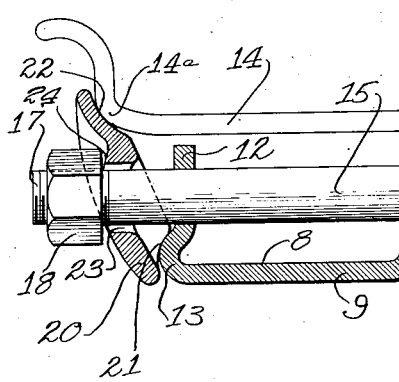
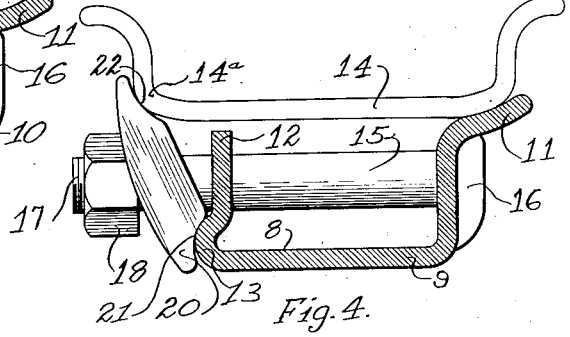
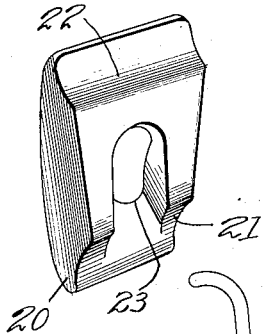
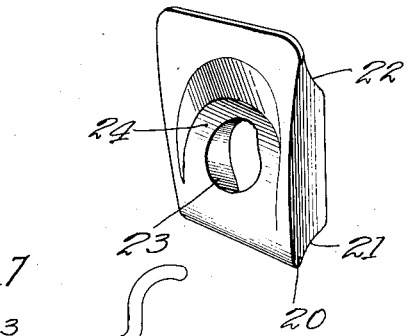
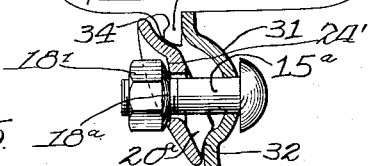
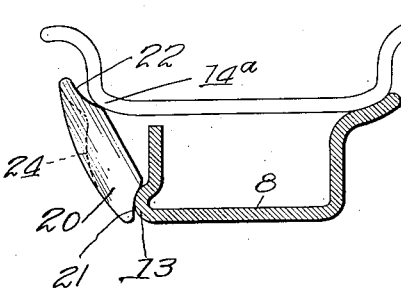
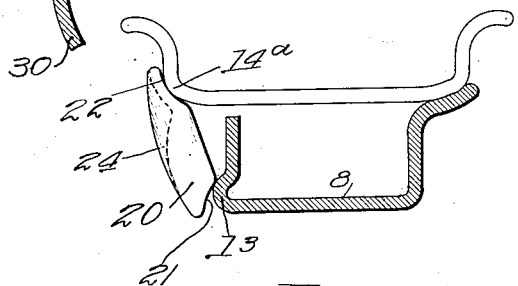
Inventor:
Charles F. Rubsam,
by Fred Gerlach
his Atty.

Patented Sept. 28, 1926.

1,601,455

UNITED STATES PATENT OFFICE.

CHARLES F. RUBSAM, OF JACKSON, MICHIGAN, ASSIGNOR TO RUBSAM CORPORATION, OF JACKSON, MICHIGAN, A CORPORATION OF DELAWARE.

WHEEL.

Application filed July 27, 1923. Serial No. 654,081.

The invention relates to wheels provided with demountable tire-rims. The objects of the invention are to provide: improved rim-securing devices by which the transverse radial stresses applied to the rim will be properly proportioned or distributed to avoid excessive radial or lateral pressure on the rim, despite the commercial variations which inevitably occur in rims intended to be of the same size; rim-securing devices which are free to position themselves for the proper distribution of the radial and transverse stresses; and securing devices in which the clamps will not tend to bend or distort the bolts for securing them in place.

The invention consists in the several novel features hereinafter set forth and more particularly defined by claims at the conclusion hereof.

In the drawings: Fig. 1 is a section through a wheel embodying the invention, the section being taken through one of the clamp-lugs. Fig. 2 is a similar view, the clamp-lug being shown in elevation. Figs. 3 and 4 are detailed perspectives of the clamping-lug. Figs. 5 and 6 are diagrammatic views, illustrating the different positions which the lug may assume before it is correctly positioned by pressure applied by the bolt. Fig. 7 is a section showing a modified form of the invention.

The invention is exemplified in connection with a wheel of the type exhibited in Letters Patent No. 1,403,439 dated Jan. 10, 1922. The felloe or fixed rim 8 is made of a channel-section and comprises a base 9 adapted to receive the wheel spokes in usual or any suitable manner; an inner annular side 10 extending upwardly at substantially a right-angle to the base; an outwardly flared rim-receiving flange 11 formed as a continuation of side 10; an outer side 12; and an annular bead or bulge 13 between base 9 and side 12. A demountable tire-carrying rim 14, of usual or any suitable type, is adapted to fit and internally seat, at one of its sides, on flange 11 and its other side may be centered on arcuate portions of the side-flange 12 intermediate the clamping devices, as exemplified in application Serial No. 329,500 filed by me October 9, 1919.

Clamping-devices in any desired or suitable number are provided to removably secure the rim 14 on the felloe. Each of said devices comprises a lug 20 and a bolt 15 having a head 16 which engages felloe-side 10. The shank of the bolt extends through aligned holes in felloe-sides 10 and 12 and projects outwardly from the latter flange. The projecting end of the bolt is provided with a screw-thread 17 for a correspondingly threaded nut 18 which is adapted to operate and secure the clamping-lug 20 against the rim and felloe.

Each lug 20 has one end formed with a curved seat 21 to engage the bulge 13 of the felloe and its other end with a curved seat 22 for engaging the curved or corner portion 14ª of the rim 14. Each lug is also provided with a hole 23 for bolt 15 and with a radially and cylindrically convex outer bearing-face 24 for the inner flat face of the nut 18, so the lug will be free to tilt or move radially relatively to the bolts and so the bearing-point of the nut will always be approximately on the center of the bolt. Hole 23 is elongated to permit radial movement of the lug relatively to the bolt. The curve of seat 21 is struck upon a radius somewhat greater than the radius of the bulge 13 of the felloe and the curve of seat 22 on the lug is formed on a radius somewhat greater than the radius of the curved portion 14ª of the rim 14. Seats 21 and 22 are flared outwardly or inwardly convergent and formed so that the lug is free to move radially and so it will not independently interlock with the rim and felloe.

In the manufacture of these rims and felloes, there are slight commercial variations in the internal diameter of the rim and also in the felloe, resulting from the rolling process of manufacture generally used. In wheels in which these securing-lugs are used. it is desirable to properly proportion the pressure applied to the rim so that there will be the requisite lateral pressure to hold the rim on the felloe-flange 11 and sufficient outward radial pressure against the rim at the lug-side to efficiently secure it. To attain this result, it is essential that the lug should be correctly positioned between the felloe and the rim so that it will not exert an excess or deficiency of radial or lateral pressures. In the securing-device described, the lug will be, when it is in clamped position, secured so it will maintain the desired distribution of radial and lateral pressure desired, despite the commercial variation in the rims and felloes. To attain this result, the lug is formed with seats which are flared and shaped at its ends so they will avoid radial interlocking between the lug and the rim and between the felloe and rim. This formation leaves the lug free to position itself between the rim and felloe. For example, if the lug should be placed against the rim and felloe so it will bear mainly on the felloe-bulge 13, as shown in Fig. 5, an excessive outward radial pressure against the rim and a corresponding deficient lateral pressure would result. Since, however, the lug is free to move radially between the rim and felloe, the nut will force the lug into position for the approximately correct distribution of stresses, as shown in Figs. 1 and 2, so that the approximate distribution of the lateral and radial stresses will be retained, notwithstanding these commercial variations. The nut will bear against the curved bearing face 24 of the lug in such a manner that the swinging or radial movement of the lug will not be prevented by the nut. A similar result follows if the lug is initially positioned too far inwardly on the felloe-bulge 13, as indicated in Fig. 6. The pressure applied by the nut to the lug will then force the inner end of the lug outwardly on the felloe-bulge until the lug is seated, as shown in Figs. 1 and 2, and approximately the desired distribution of radial and lateral stresses on the rim is attained. When the lugs are incorrectly positioned, the pressure of the nut at the center of the bolt and shape of the lug-terminals will cause the lug to slide on the rim and felloe and rock around its bearing against the nut, if necessary, to centralize the lug into its correct position. Another characteristic is that the lug does not exert any substantial bending moment on the bolt, because the curved face 24 is always engaged by the nut only at a point adjacent the center of the bolt, so the stresses will be axially of the bolt. This curved bearing face also permits the lug to tilt so it will be operable to its correct position, without exerting any substantial bending moment on the bolt. Another characteristic is that the lug, when held by the nut, is always under tension so it will retain the nut on the bolt, and as soon as the lug is released from the pressure of the nut, it can be easily removed, the pressure of the rim and felloe against the flared seats on the lug permitting its ready removal.

In Fig. 7, the invention is applied to a wheel-body formed of a disk 30 having its outer portion or felloe formed with an annular groove 31 which is joined to the central portion of the disk by a curved seat or bulge 32 on which one end of the clamping lug 20ª is seated. The rim 14ᵇ is provided with an annular bead 33 which is provided with a curved portion 34 engaged by the other end of the lug 20ª.

In this form of the invention, the nut 18' is provided with a spherically convex face 18ª which is adapted to engage a slightly curved surface 24' on the outer side of lug 20ª. These surfaces on the nut and lug respectively exhibit another form of the invention in which the lugs will be free to adjust itself radially of the wheel while it is being forced into its operative position.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. The combination with a wheel-body having a fixed metallic rim and a demountable rim adapted to be secured on the fixed rim, of attaching lugs for the rim and bolts secured in the fixed rim and provided with nuts for laterally forcing the lugs into operative position, the fixed rim at one side and the inner ends of the lugs having complementary seats formed to hold the lugs to support the demountable rim radially and for lateral engagement with each other, the outer ends of the lugs and the demountable rim at one of its sides being provided with complementary seats shaped so the lugs will support the demountable rim radially and for engagement to apply lateral pressure to the demountable rim, all of said seats being shaped to permit the lugs to move radially and laterally and relatively to the rims under control of the seats on the rims while the nuts are being tightened and so the lugs will be positioned by the complementary seats, the lugs and nuts being provided with abutting faces which permit the lugs to be so positioned.

2. The combination with a wheel-body having a fixed metallic rim provided with a flared flange at one side, and a demountable rim adapted to seat at one side and be secured on the flared flange, of attaching lugs for the other side of the demountable rim, and bolts secured in the fixed rim and provided with nuts for laterally forcing the lugs into operative position, the fixed rim and the inner ends of the lugs having complementary seats formed to hold the lugs to support the demountable rim radially and for lateral engagement with each other, the outer ends of the lugs and the demountable rim at one of its sides being provided with complementary seats shaped so the lugs will support the demountable rim radially and for engagement to apply lateral pressure to the demountable rim, all of said seats being shaped to permit the lugs to move radially and rock laterally relatively to the rims under control of the seats on the rims while the nuts are being tightened, so the lugs will be positioned by the complementary seats, the lugs and nuts being provided with abutting faces which permit the lugs to be so positioned.

3. The combination with a wheel body having a fixed metallic rim and a demountable rim adapted to be secured on the fixed rim, of attaching lugs for the rim and bolts secured in the fixed rim and provided with nuts for laterally forcing the lugs into operative position, the fixed rim and inner ends of the lugs having complementary seats formed to hold the lugs to support the demountable rim radially and for lateral engagement with each other, the outer ends of the lugs and the demountable rim at one of its sides being provided with complementary seats shaped so the lugs will support the demountable rim radially and for engagement to apply lateral pressure to the demountable rim, all of said seats being shaped to permit the lugs to rock laterally and move radially relatively to the rims under control of the seats on the rims while the nuts are being tightened, and so the lugs will be positioned by the complementary seats, the lugs having cylindrically convex faces engaged by the nuts to permit the lugs to rock relatively to the nuts.

4. The combination with a fixed metallic wheel-rim provided on one of its sides with an annular outward bulge, a demountable rim adapted to be secured on the fixed rim, of rim securing lugs, each having curved seats at its inner and outer ends to engage the bulge on the fixed rim and the curved portion of the demountable rim respectively, the seats being formed so the lugs will radially support the demountable rim, and bolts, each passing through one of the lugs and provided with a nut, the seats on the lugs being flared outwardly at both ends to leave the lugs free to move radially and to be positioned by the seats on the rims while they are being secured by the nuts, the lugs and nuts being provided with abutting faces which permit such movement.

Signed at Jackson, Michigan, this 18th day of July, 1923.

CHARLES F. RUBSAM.